(12) United States Patent
Bilger et al.

(10) Patent No.: US 12,003,493 B2
(45) Date of Patent: Jun. 4, 2024

(54) DEVICE PRE-AUTHENTICATION

(71) Applicant: Verizon Patent and Licensing Inc., Basking Ridge, NJ (US)

(72) Inventors: Brent R. Bilger, Los Altos Hills, CA (US); Rajesh M. Patel, Saratoga, CA (US); Shailesh K. Venugopal, Gilroy, CA (US); Anurag Dave, Sammamish, WA (US); Michel J. Basmaji, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 324 days.

(21) Appl. No.: 17/197,616

(22) Filed: Mar. 10, 2021

(65) Prior Publication Data
US 2022/0294773 A1 Sep. 15, 2022

(51) Int. Cl.
*H04L 9/40* (2022.01)
*G06F 21/45* (2013.01)
*H04L 9/08* (2006.01)
*H04W 12/062* (2021.01)

(52) U.S. Cl.
CPC .............. *H04L 63/08* (2013.01); *G06F 21/45* (2013.01); *H04L 9/0866* (2013.01); *H04L 63/166* (2013.01); *H04W 12/062* (2021.01)

(58) Field of Classification Search
CPC ... H04L 9/0863; H04L 9/0866; H04L 9/3242; H04L 9/3297; H04L 63/08; H04L 63/166; G06F 21/31; G06F 21/44; G06F 21/45; H04W 12/062; H04W 12/069
USPC ............................................................ 726/7
See application file for complete search history.

(56) References Cited

U.S. PATENT DOCUMENTS

2011/0252239 A1* 10/2011 Lai ........................ H04L 9/0838
713/168
2022/0294773 A1* 9/2022 Bilger ................... H04L 9/3242

OTHER PUBLICATIONS

RFC 4279 Pre-Shared Key Ciphersuites for Transport Layer Security (TLS) P. Eronen, Ed.; H. Tschofenig, Ed. (Year: 2005).*
RFC 3546 Transport Layer Security (TLS) Extensions S. Blake-Wilson; M. Nystrom; D. Hopwood; J. Mikkelsen; T. Wright (Year: 2003).*

* cited by examiner

Primary Examiner — Benjamin A Kaplan

(57) ABSTRACT

A method, a device, and a non-transitory storage medium are described in which an pre-authentication service is provided. The service may support a transport layer security handshake and determine authentication based on the initial message. The service may provide for the generation of a message that initiates a handshake between devices in which the message includes an authentication string used for authentication. The service may provide for the generation of another authentication string for comparison. The service may also support authorization of a device. The service may minimize potential malicious attacks and activities between the devices.

20 Claims, 7 Drawing Sheets

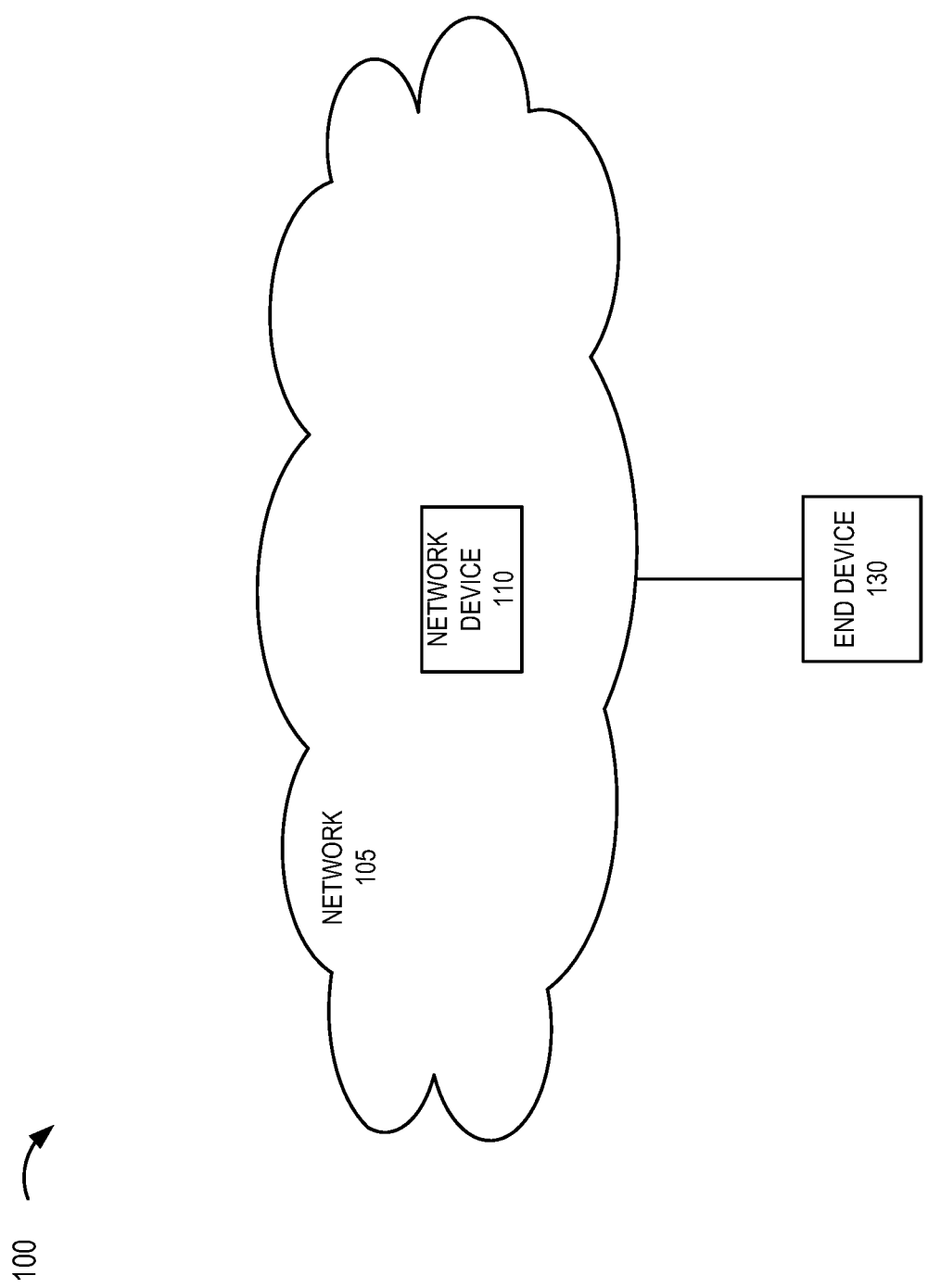

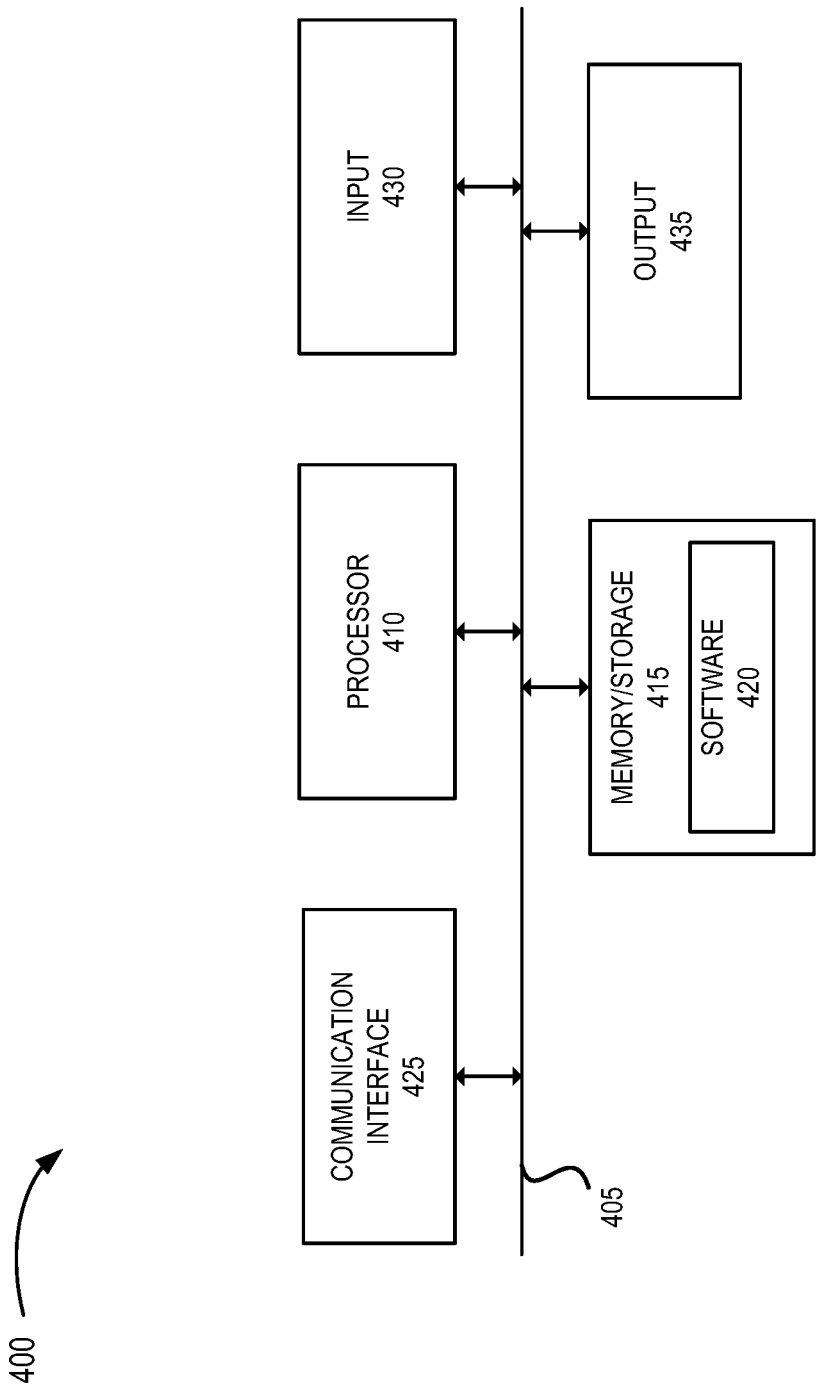

DEVICE PRE-AUTHENTICATION

BACKGROUND

Ubiquitous communication and information exchange offers users innumerable advantages. However, under current paradigms, network security always remains an issue. For example, in the past several years, hackers have reportedly breached data storage facilities and obtained sensitive data.

BRIEF DESCRIPTION OF THE DRAWINGS

FIG. 1 is a diagram illustrating an exemplary environment in which an exemplary embodiment of a pre-authentication service may be implemented;

FIG. 4 is a diagram illustrating exemplary components of a device that may correspond to one or more of the devices illustrated and described herein.

DETAILED DESCRIPTION

Figure 2A:
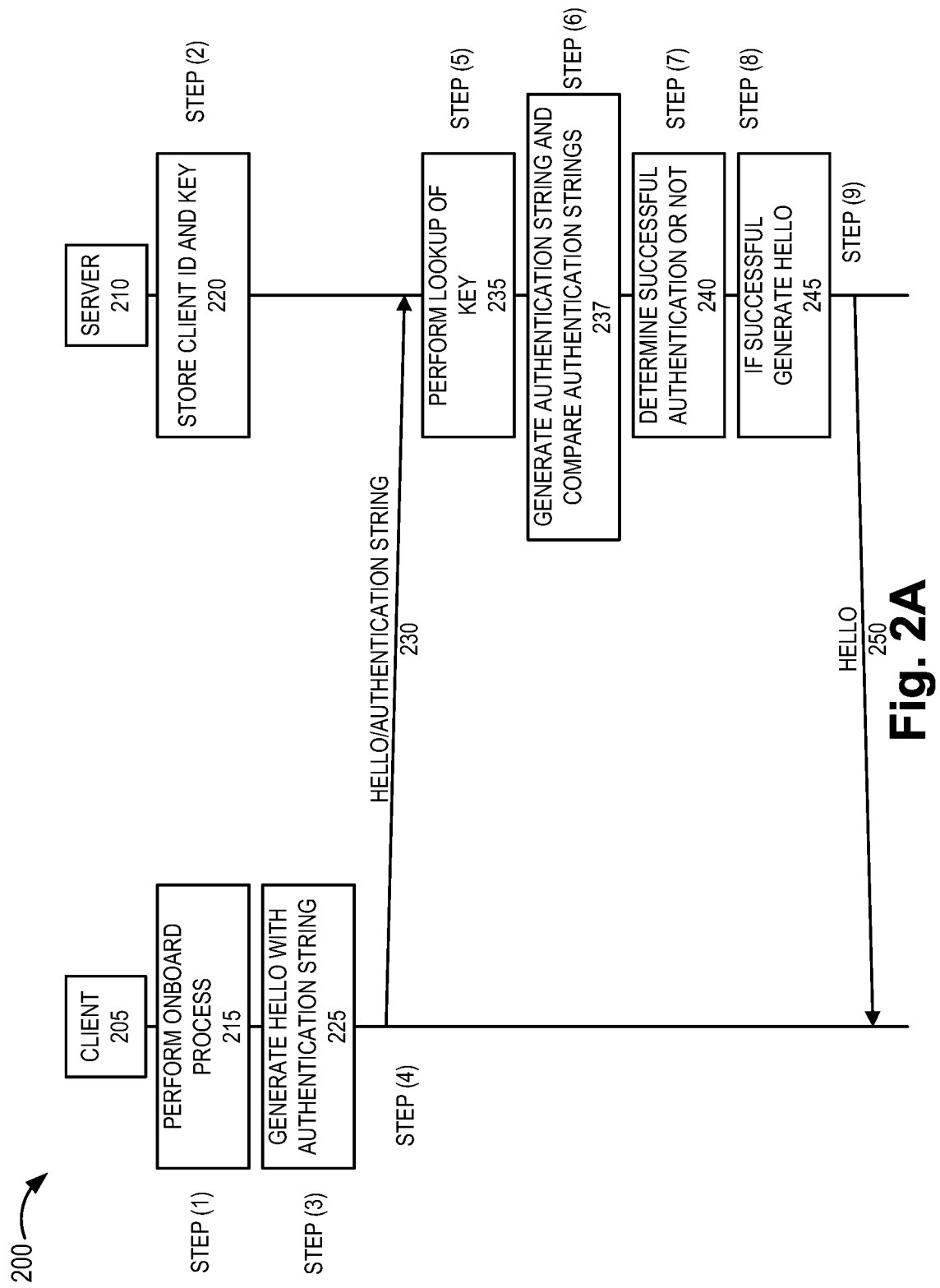
FIG. 2A is a diagram illustrating an exemplary process of an exemplary embodiment of the pre-authentication service.

The following detailed description refers to the accompanying drawings. The same reference numbers in different drawings may identify the same or similar elements. Also, the following detailed description does not limit the invention.

Security between device-to-device communication is an area of concern in a network environment. For example, a device may be subject to an attack and/or a message may be subject to interception, alteration, and/or other malicious process. There are various techniques and/or technologies related to security, such as authentication, authorization, message integrity, non-repudiation, among others, to protect devices and communications.

Among the various techniques and/or technologies that may offer security include the use of certain communication protocols. For example, Transport Layer Security (TLS) protocols may allow client/server applications to communicate in a secure way. While a most recent version of TLS (e.g., TLS 1.3) may afford some security, a device using TLS 1.3 is still susceptible to attack. For example, according to an exemplary scenario of a TLS 1.3 client-to-server handshake, a client device may use significant network resources to generate a public-private key pair to begin the handshake process. However, an adversarial device may send any random number to a server device (e.g., in a "Client Hello" message) causing the server device to expend significant network resources and facilitating a resource denial of service (DoS) attack.

In addition to potential attacks, for example, the TLS 1.3 handshake is also susceptible to reconnaissance for vulnerabilities and/or misconfigurations. For example, the transmission of a Server Hello by the server device to the client device may permit an adversarial device to perform a port scan on a part of an Internet Protocol (IP) address space and learn an IP address of the server device, as well as learn the existence of the server device. Additionally, after a shared key exchange in which the adversarial device has a connection to the server device, the adversarial device may search for vulnerabilities and/or misconfigurations at the server device, which may be performed without ever logging into the server device. Another deficiency of the TLS 1.3 handshaking process is that the server device may not determine whether the client device is authorized to access the server device until after the client device completes a log-in page, for example. However, the login of the client device typically occurs as one of the last steps in a TLS 1.3 handshaking process thereby allowing the adversarial device to perform an attack or search for vulnerabilities and/or misconfigurations in relation to any of the prior steps of the TLS 1.3 handshaking process. As a result, devices and communications may be compromised, network resources may be unnecessarily wasted along with a degradation in the quality of service associated with an application service, for example.

According to exemplary embodiments, a pre-authentication service is described. According to an exemplary embodiment, the pre-authentication service may be implemented between devices, such as an end device and a network device, between network devices, or between end devices, for example. According to an exemplary embodiment, the pre-authentication service may be implemented in a client-server architecture. According to other exemplary embodiments, the pre-authentication service may be implemented in a non-client-server architecture (e.g., peer-to-peer or another type of architecture). According to various exemplary embodiments, the logic of the pre-authentication service may be included in an operating system (OS) of a device or an application of a device (e.g., a web browser, a mobile application, or some other type of application).

According to an exemplary embodiment, a TLS handshake procedure may include the pre-authentication service, as described herein. For example, a Client Hello may include an authentication string, such as a password (e.g., one-time password) or some other type of string that may be used to authenticate and/or authorize a device. According to some exemplary embodiments, the authentication string may include plaintext and a message authentication code (MAC), as described herein. In this way, a server device may determine whether the client device should be authenticated prior to responding to the initial Hello of the TLS handshake procedure from the client device. Additionally, this mechanism may eliminate the server device from expending significant resources (e.g., processor, memory, and other device resources) on unauthorized client devices, and may prevent an adversarial device from conducting reconnaissance for vulnerabilities and/or misconfigurations of the server device because the server device may determine that the client device is not authorized without responding to the client device. As such, the adversarial device posing as an authorized client device may be unable to determine if the server device even exists, and the server device may thwart a potential resource denial of attack at the server device. According to other exemplary embodiments, the authentication string may include instances of data different from plaintext and a MAC.

According to other exemplary embodiments, a non-TLS handshake procedure may include the pre-authentication service, as described herein. For example, instead of a modified TLS 1.3 or a modified TLS 1.2 handshake procedure that may include the pre-authentication service, as described herein, an IP security (IPsec) protocol handshake procedure or another type of handshake procedure may include the pre-authentication service, as described herein. For example, a first or an initial message of the handshake between devices may include the authentication string along with the performance of other steps or functions of the pre-authentication service, as described herein. The initial message may be implemented as a request or some other non-Hello message.

The process of using the password to determine whether the client device should be authenticated may involve a lookup (e.g., in a database and/or a data structure) which may expend server device resources. However, according to an exemplary embodiment, the pre-authentication service may include generating a secret key based on the password. For example, a server device may generate the secret key of the client device based on the unique client identifier included in the password. In this way, the server device may not perform the lookup.

In some situations, however, an adversarial device may obtain multiple keys associated with one or multiple client devices. In view of this possibility, according to an exemplary embodiment, the secret key may be valid for a configured number of times. For example, a short-term secret key may be valid for a single login (or another configurable number of logins) by a client device to a server device. Additionally, or alternatively, the server device may manage a data structure that stores identifiers of unauthorized client devices, for example. As an example, a balanced tree may store blacklisted clients that may be searched using a balanced tree search algorithm. According to such an exemplary implementation, the balanced tree search algorithm may generate master server keys from which the server device may generate the short-time secret keys, as described herein.

In view of the foregoing, the pre-authentication service may improve device and communication security, as described herein. The pre-authentication service may prevent malicious attacks, reconnaissance for vulnerabilities and/or misconfigurations, minimize the usage of device resources, and provide a reliable mechanism for authenticating devices.

FIG. 1 is a diagram illustrating an exemplary environment 100 in which an exemplary embodiment of the pre-authentication service may be implemented. As illustrated, environment 100 includes a network 105. Network 105 may include a network device 110. Environment 100 further includes an end device 130.

The number and arrangement of network devices, end devices, and networks in environment 100 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture.

Environment 100 includes a communication link between network device 110 and end device 130. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Network 105 may include one or multiple networks of one or multiple types and technologies. For example, network 105 may include an access network, a core network, a private network, a public network, an application layer network, a local area network (LAN), a wireless network, a wired network, an optical network, and/or other suitable network that may enable communication between network device 110 and end device 130.

Network device 110 may include a device that provides the pre-authentication service, as described herein. According to an exemplary embodiment, network device 110 may include a server component. According to some exemplary embodiments, network device 110 may provide an application service. For example, according to such an embodiment, network device 110 may be implemented as a web server or another type of Internet device. According to other examples, network device 110 may be implemented as a gateway device, a router, or some other type of network device. According to other exemplary embodiments, network device 110 may not include a server component. For example, a peer component, a client component, or some other non-server or non-client component that may include logic that provides the pre-authentication service, as described herein.

End device 130 may include a device that provides the pre-authentication service, as described herein. According to an exemplary embodiment, end device 130 may include a client component. For example, end device 130 may be implemented as a mobile device, a portable device, a stationary device (e.g., a non-mobile device), a device operated by a user, a device not operated by a user, an Internet of Things (IoT) device, or some other type of device. According to other exemplary embodiments, end device 130 may not include a client component. For example, a peer component, a server component, or some other non-client or non-server component that may include logic that provides the pre-authentication service, as described herein. End device 130 may be configured to execute various types of software (e.g., applications, programs, etc.). The number and the types of software may vary among end devices 130.

FIG. 2A is a diagram illustrating an exemplary process 200 of an exemplary embodiment of the pre-authentication service. As illustrated, steps of process 200 may be performed by a client 205 and a server 210. For example, end device 130 may include client 205 that provides an exemplary embodiment of the pre-authentication service, and network device 110 may include server 210 that provides an exemplary embodiment of the pre-authentication service. According to other exemplary embodiments, architectural components different from client 205 and server 210, as described herein, may perform process 200. According to some exemplary embodiments, process 200 may be implemented as a TLS-based handshake procedure. For example, communication of a message may be supported by a user datagram protocol/IP (UDP/IP) stack (e.g., according to a TLS 1.3-based handshake) or a transport control protocol (TCP/IP) stack (e.g., according to a TLS 1.2 or lower version-based handshake).

Referring to FIG. 2A, in a step (1), client 205 may perform an on-boarding process 215. According to various exemplary embodiments, the on-board process may involve communication between client 205 and server 210 or communication between client 205 and another network device (not illustrated). In either case, according to an exemplary embodiment, the on-board process may include issuing a unique identifier that identifies client 205 and/or end device 130 (e.g., a universal client identifier (UCID) or another type of identifier which may or may not be globally unique among other clients 205 and/or relative to server 210), and a secret key. The on-board process may also include specifying a message authentication code (MAC) algorithm to be used with the unique identifier and the secret key by client 205, as described herein. Client 205 may receive and store this information. Additionally, a step (2) of process 200 may include server 210 storing the identifier and key 220. Server 210 may also store information indicating the MAC algorithm.

In a step (3), after the on-board process, client 205 may generate a hello (message) that includes an authentication string 225. According to an exemplary embodiment, the authentication string may be generated based on the unique identifier, the secret key, and a MAC algorithm. For example, client 205 may generate the authentication string or one-time password (OTP) according to the exemplary expression:

$$\text{UCID}|\text{timestamp}|\text{counter}|\text{MAC}[\text{UCID}|\text{timestamp}|\text{counter},Ks] \qquad (1),$$

in which UCID is the unique identifier; timestamp is the time (e.g., indicated in a universal coordinated time format); counter is a number that has a random initial value and counts up within the time window of the valid timestamp; MAC is a keyed message authentication code outputted by a MAC algorithm applied to the UCID, timestamp, counter and Ks (as indicated by the brackets) using the key, Ks; and Ks is the secret key that is shared between client 205 and server 210. The MAC algorithm may be implemented by a hash-based MAC or a keyed-hash MAC.

The UCID, the timestamp, and the counter are exemplary instances of data that may be used as a part of a plaintext portion of the authentication string of the pre-authentication service. These exemplary instances of plaintext may be concatenated with the MAC to form the authentication string. According to an alternative format, the authentication string may concatenate the plaintext and the MAC in a different order. The MAC algorithm may use the plaintext and the secret key to output the MAC. According to other exemplary embodiments, other variations may be implemented, such as the authentication string including an encryption of the plaintext (e.g., ciphertext), the MAC algorithm using encrypted data or encrypted data in combination with non-encrypted data, and so forth.

According to an exemplary embodiment, client 205 may insert the authentication string in a Client Hello message. For example, the Client Hello may be implemented with a format of a TLS 1.3 Client Hello. In contrast to the format and/or information included in the TLS 1.3 Client Hello, the Client Hello of the pre-authentication service includes the authentication string. For example, the authentication string may be included in an extension field or a new field of the Client Hello (e.g., reserved field, a proprietary field, etc.).

In a step (4), client 205 may transmit the Client Hello 230 to server 210. In step (5), server 210 may receive the Client Hello, and may perform a lookup for the secret key 235 pertaining to client 205. For example, server 210 may read or extract the authentication string from the Client Hello and determine the secret key associated with the unique identifier of client 205. For example, server 210 may use the UCID included in the authentication string and perform a lookup in a database or a data structure to determine the secret key of client 205. As previously described, according to an exemplary embodiment, in step (2), server 210 may store information that correlates identifiers of clients 205/end devices 130 with (secret) keys 220. It may be assumed according to this exemplary scenario, that server 210 finds a match between the identifier included in the authentication string and the stored correlated identifier-key information. However, according to other exemplary scenarios, when server 210 does not find a match, server 210 may determine that client 205 or end device 130 is not authorized and/or authenticated, and end process 200.

In step (6), server 210 may generate an authentication string in a manner similar to client 205 and compare the authentication strings 237. For example, server 210 may use expression (1) or another expression, as described herein, that corresponds to what is used by client 205 to calculate the authentication string. Based on the comparison of the authentication strings, in step (7), server 210 may determine whether client 205 has successfully authenticated or not 240. For example, when the authentication strings match, client 205 is authenticated, and when the authentication strings do not match, client 205 is not authenticated.

In step (8), if client 205 is successfully authenticated, server 210 may generate a server Hello. In step (9), server 210 may transmit 250 the server Hello to client 205. Upon receipt of the server Hello by client 205, the (TLS) handshake may be completed. Thereafter, according to a TLS-based handshake, client 205 and server 210 may perform shared key calculations, connection steps, and/or other types of communication related procedures, for example.

FIG. 2A is a diagram illustrating an exemplary process 200 of the pre-authentication service, however according to other exemplary embodiments, process 200 may include additional, different, and/or fewer steps. For example, one or more steps of the on-boarding process, as described, may be omitted. By way of further example, client 205 may not perform the on-board process before each time client 205 generates and transmits a (client) Hello to server 210, as described herein. Additionally, or alternatively, server 210 may perform a lookup in a database, a data structure, or another type of information structure that indicates unauthorized clients 205 and/or end devices 130. For example, server 210 may store a blacklist, a balanced tree, or another suitable information repository, and use the information to identify unauthorized or malicious devices. Server 210 may perform the lookup anytime after receiving the Client Hello from client 205, which may occur before, after, or concurrently with an authentication step of process 200, for example. Also, such a step may be performed in addition to the key lookup, as described herein. Additionally, or alternatively, server 210 may store the identifier of client 205 in the blacklist or balanced tree in response to the authentication strings not matching (e.g., in step (7)). Additionally, or alternatively, server 210 may also remove the UCID from a database that stores the correlated identifier and secret key (e.g., in step (2)), for example.

According to another exemplary embodiment, client 205 may generate the authentication string using different data that may provide additional security benefit. For example, the authentication string may indicate an additional trustworthiness of client 205. According to an exemplary embodiment, the authentication string may include anti-malware data. Currently, anti-malware products may implement their functionality "from the cloud." That is, an anti-malware agent residing on end device 130 may report to a central manager an indication of its health or lack thereof associated with end device 130. Here, server 210 may use this fact to perform a trust analysis of client 205 before authorizing client 205 to connect to server 210. For example, client 205 may include data indicating or an identifier that identifies an anti-malware vendor (AMV) and an anti-malware universal identifier (AMUID), which may identify an anti-malware component of end device 130 or client 205. According to such an exemplary embodiment, client 205 may generate the authentication string or OTP according to the exemplary expression:

UCID|timestamp|counter|AMV|AMUID|MAC[U-
CID|timestamp|counter|AMV|AMUID,Ks]     (2).

After receiving the authentication string, server 210 may transmit a message, which may include the AMUID of end device 130, to a network device associated with the AMV (e.g., a cloud AM manager device or another type of centralized AM device) (not illustrated in FIG. 2A). The network device may determine a current state (e.g., health state) of end device 130 based on the AMUID and transmit a message to server 210 indicating the result. The message may include data that indicates a health state of end device 130 (e.g., positive or negative, a level of health among two or more possible levels of health (e.g., low, medium, high, etc.)), for example. Alternatively, the message may indicate that end device 130 is not subscribed to the AM service, end device 130 has been blacklisted, and/or relevant information pertaining to end device 130. Based on the response message, server 210 may assess the trustworthiness of client 205, and determine whether or not to accept or reject a connection with end device 130.

Figure 2B:
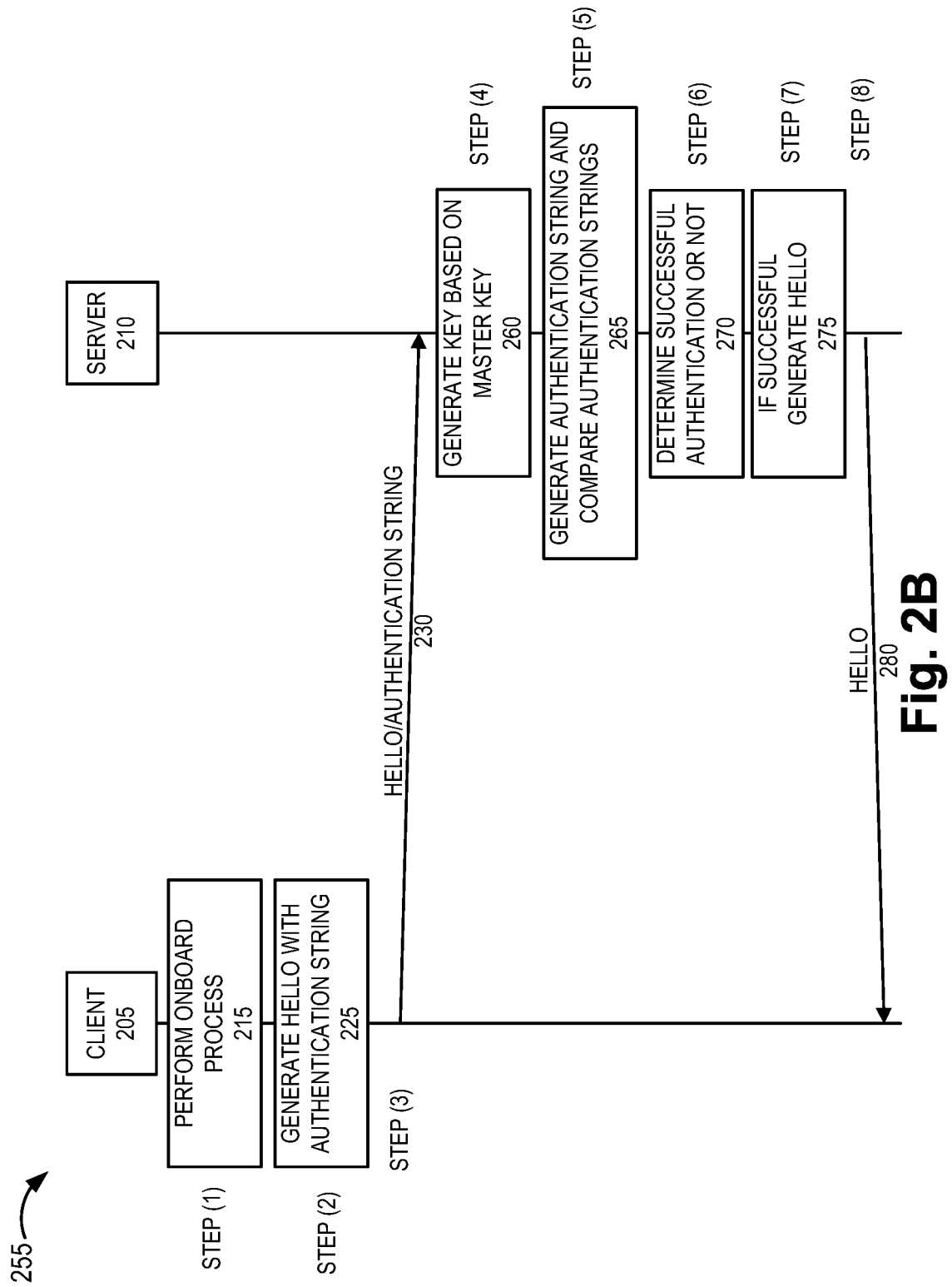
FIG. 2B is another diagram illustrating another exemplary process of an exemplary embodiment of the pre-authentication service.

FIG. 2B is a diagram illustrating another exemplary process 255 of an exemplary embodiment of the pre-authentication service. As illustrated, steps of process 255 may be performed by client 205 and server 210. According to other exemplary embodiments, architectural components different from client 205 and server 210, as described herein, may perform process 255. According to some exemplary embodiments, process 255 may be implemented as a TLS-based handshake procedure, as described herein.

Steps (1), (2), and (3) of process 255 may be performed by client 205 in a manner similar to steps (1), (3), and (4) of process 200. In contrast to process 200, process 255 may omit step (2) of process 200 in which correlated identifiers and keys may be stored by server 210.

Referring to FIG. 2B, in step (4), instead of performing a lookup based on receiving the Client Hello including the authentication string, server 210 may generate the (secret) key of client 205 based on the following exemplary expression:

Ks=MAC[UCID,Km]     (3), in which Ks is the secret key, MAC is the MAC algorithm, UCID is the identifier of client 205 and/or end device 130, and Km is a master key. According to an exemplary embodiment, the master key may be known by server 210 but not known by client 205. Steps (5)-(8) of process 255 may be performed by server 210 in a manner similar to steps (6)-(9) of process 200. This alternative approach may use fewer resources at server 210 than the performing the lookup. According to various exemplary embodiments, the performance of the onboarding process 215 of step (1) in process 255 may include server 210 or another network device (not illustrated) that may generate a random identifier of client 205 and/or end device 130 and uses expression (3) to generate the secret key. Thereafter, server 210 or the other network device may provide client 205 with its identifier (e.g., UCID or another suitable identifier) and its key (e.g., a secret key). However, according to some exemplary embodiments, server 210 may perform a procedure to ensure that client 205 is still authorized, which may involve performing a lookup to a database, data structure, or another type of information structure that may store information that identifies authorized (e.g., whitelisted, etc.) or not authorized (e.g., blacklisted, etc.) clients 205 or end devices 130. The information may include the identifiers of clients 205 and/or end devices 130, for example.

FIG. 2B is a diagram illustrating an exemplary process 255 of the pre-authentication service, however according to other exemplary embodiments, process 255 may include additional, different, and/or fewer steps. For example, according to other exemplary embodiments, the secret key may be calculated based on additional and/or different data, such as a master key identifier, or use cyphertext or a combination of cyphertext and plaintext by the MAC algorithm. According to an exemplary embodiment, to eliminate the lookup procedure mentioned above, a process different from process 255 may be performed, as described below.

Figure 3A:
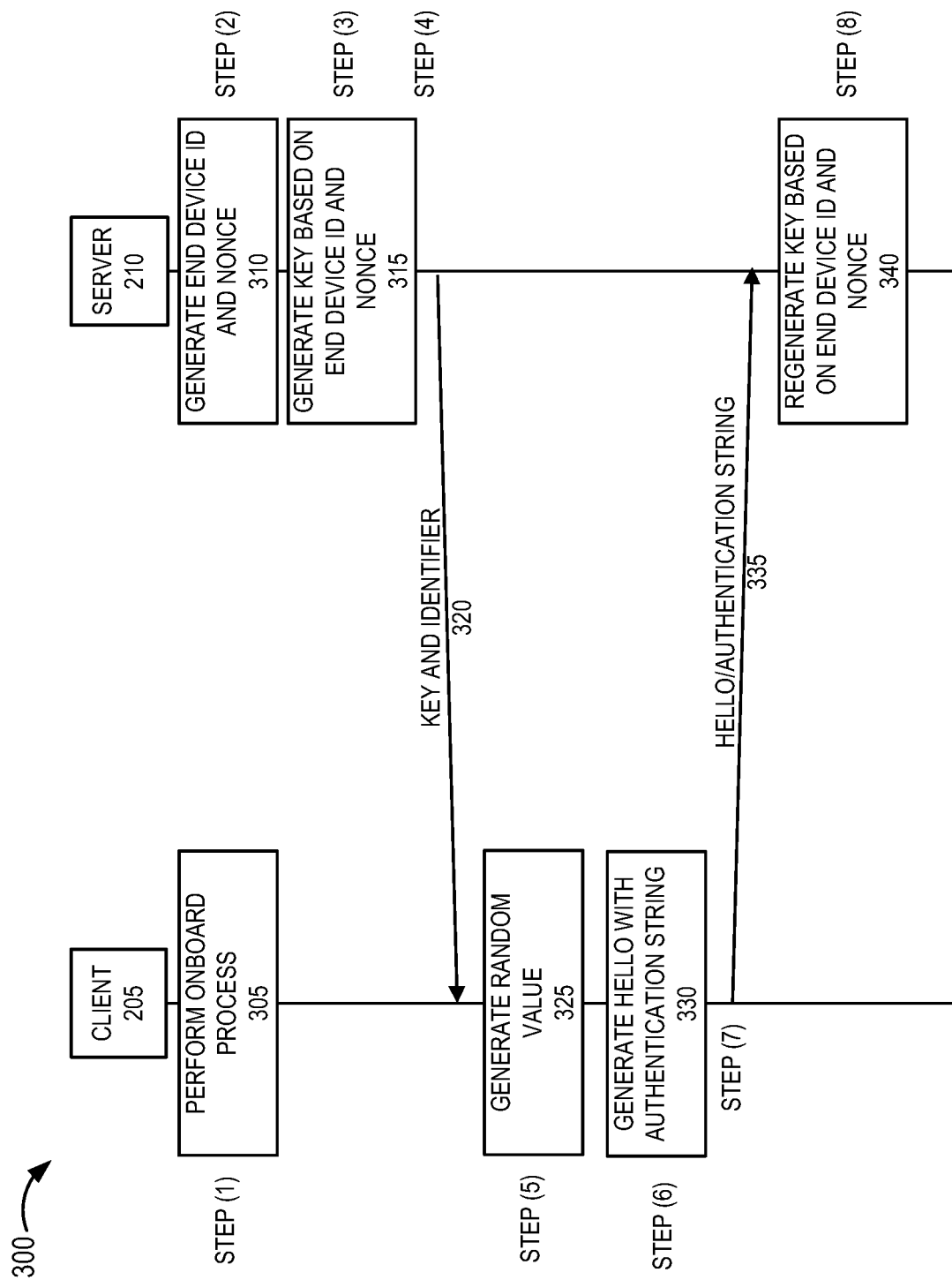
FIGS. 3A and 3B are diagrams illustrating yet another exemplary process of an exemplary embodiment of the pre-authentication service.
Figure 3B:
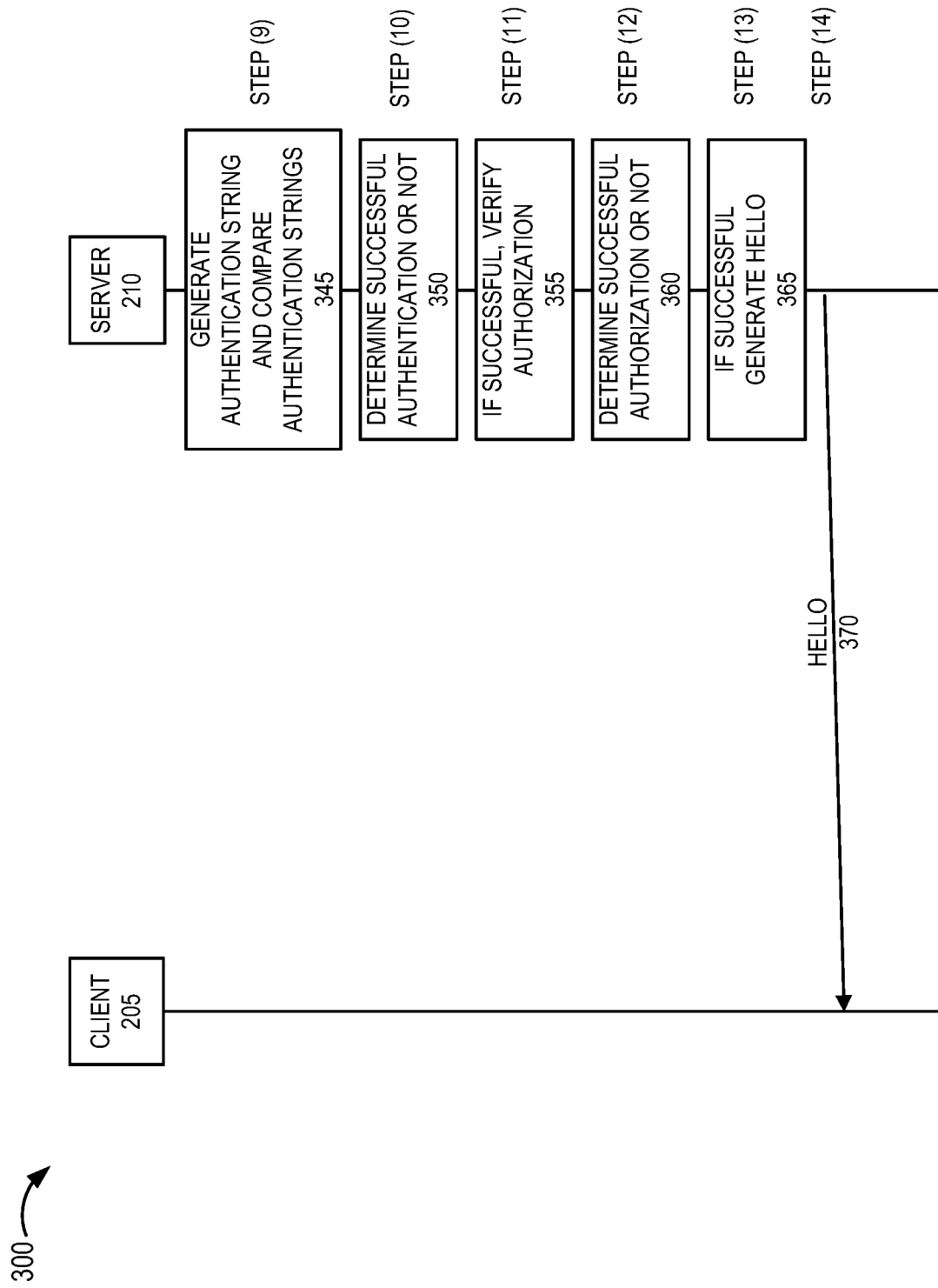

FIGS. 3A and 3B are diagrams illustrating yet another exemplary process 300 of the pre-authentication service. Referring to FIG. 3A, in step (1), client 205 may perform an on-board process 305. In step (2), as a part of the on-board process, server 210 may generate two random values 310. The two random values may include an identifier of client 205 and/or end device 130 and a number used once (NONCE). In step (3), server 210 may generate the secret key based on the identifier and the nonce 315. In contrast to process 255 and expression (3), server 210 may generate the secret key based on the following exemplary expression:

Ks=MAC[UCID|NONCE,Km]     (4).

As illustrated, in step (4), server 210 may transmit the key and the identifier 320 to client 205.

In step (5), client 205 may generate a random value 325 for an initial value of the counter. In step (6), client 205 may generate a Hello that includes an authentication string 330. According to an exemplary embodiment, client 205 may calculate the authentication string based on the following exemplary expression:

UCID|NONCE|timestamp|counter|MAC[UCID-
|NONCE|timestamp|counter,Ks]     (5).

In step (7), client 205 may transmit 335 the Hello, which includes the authentication string, to server 210. Based on receiving the Hello, in step (8), server 210 may regenerate the key 340 based on expression (4), for example. Referring to FIG. 3B, server 210 may perform steps (9) and (10) in a manner similar to that described for steps (5) and (6) of process 255.

Server 210 may also verify authorization based on a lookup in database, data structure, or another type of information repository, such as a whitelist, a blacklist, a balanced tree, etc., which may store the identifier (e.g., UCID or another type of unique identifier) that identifies client 205 and/or end device 130. For example, if authentication is successful, in steps (11) and (12), server may verify authorization 355, and determine if authorization is successful 360. If successful, in step (13), server 210 may generate 365 a Hello, and in step (14), server 210 may transmit 370 the Hello to client 205. If unsuccessful in authentication or authorization, server 210 may not respond to the Hello, blacklist client 205, not permit a connection, and so forth.

FIGS. 3A and 3B are diagrams illustrating yet another exemplary process of the pre-authentication service, however according to other exemplary embodiments, the process may include additional, different, and/or fewer steps. For example, according to various exemplary embodiments of the pre-authentication service, server 210 may perform an authorization procedure before, concurrently with authentication, or after authentication. When performed before authentication, server 210 may determine not to perform authentication, not permit a connection with client 205, update a database or other information structure to indicate client 205 is not authorized and/or authenticated (e.g., blacklisted, etc.), or another type of responsive action.

The storage and management of information indicating authorized or not authorized clients 205 may lead to issues including size. For example, a blacklisted balanced tree may grow over time. According to an exemplary embodiment, server 210 may generate a new master key (Km) that is valid for a configurable and limited time period. For example, a time period of one month versus six months or more may minimize the growth issue. Server 210 may generate keys for clients 205 using the master key, as described herein. Blacklisted clients in a balanced tree may be purged according to a slightly longer period of time, such as over a one month's time. Additionally, whitelisted clients that had not authenticated during the longer period of time may also be purged because the short-term keys of these clients would no longer be valid. According to an exemplary embodiment, a key identifier that identifies the short-term key may be included in the authentication string. For example, the authentication string may be generated based on the following exemplary expression:

$$UCID|NONCE|timestamp|counter|k\_id|MAC[UCID-|timestamp|counter|k\_id,Ks] \quad (6),$$

in which k_id may be an identifier or a pointer to the short-term master key.

FIG. 4 is a diagram illustrating exemplary components of a device 400 that may be included in one or more of the devices described herein. For example, device 400 may correspond to network device 110, end device 130, client 205, and server 210, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to end device 130 or client 205, software 420 may include an application that, when executed by processor 410, provides a function, a process, and/or a step of the pre-authentication service, as described herein. Additionally, with reference to network 110 or server 210, software 420 may include an application that, when executed by processor 410, provides a function, a process, and/or a step of the pre-authentication service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

A network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life cycle (e.g., refreshed, paused, suspended, rebooting, or another type of state or status), using well-known virtualization technologies (e.g., hypervisor, container engine, virtual container, virtual machine, etc.) in an application service layer network and/or another type of network (e.g., access network, core network, etc.). Thus, network device 110 and end device 130 described herein may be implemented as device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
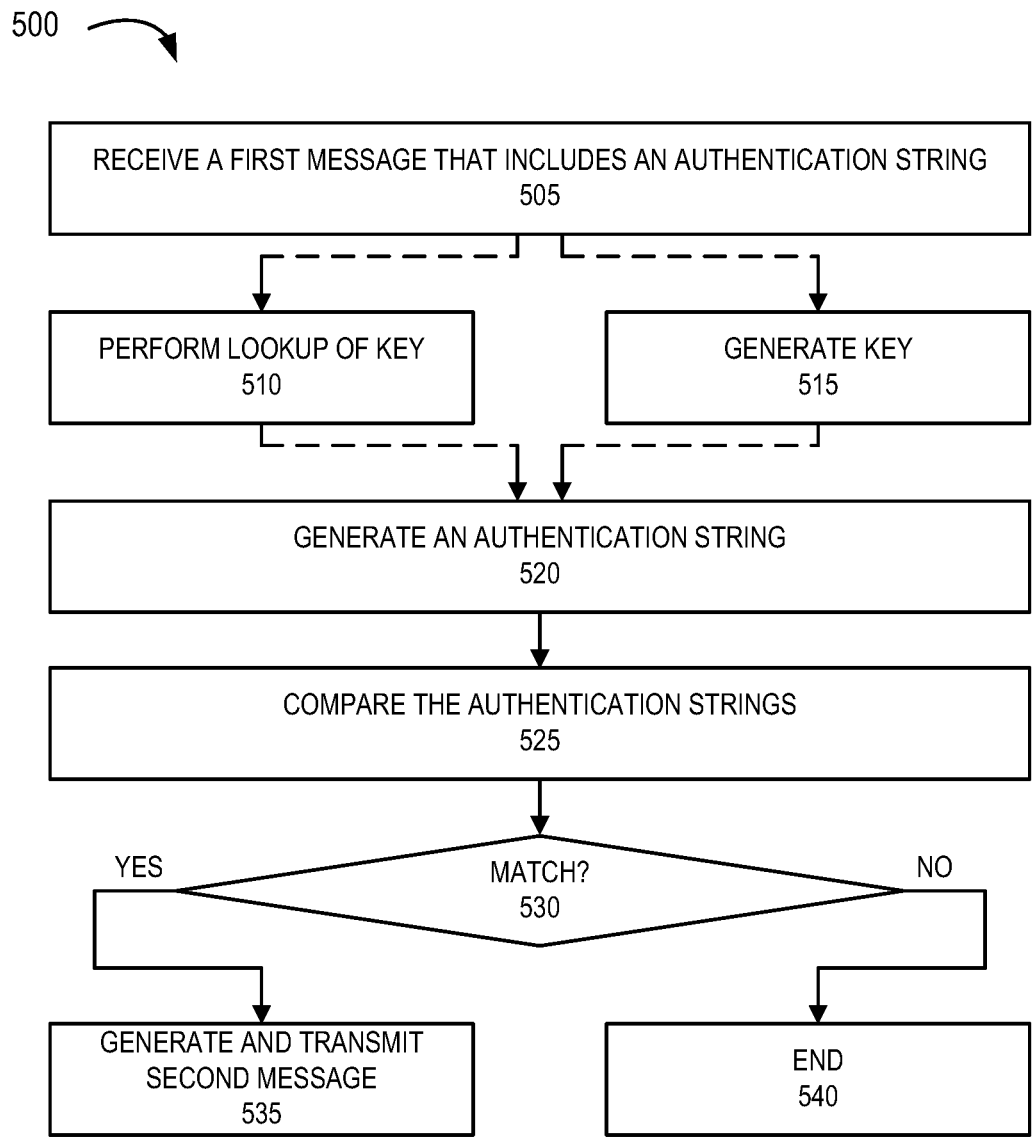
FIG. 5 is a flow diagram illustrating an exemplary process of an exemplary embodiment of the pre-authentication service.

FIG. 5 is a flow diagram illustrating an exemplary process 500 of exemplary embodiments of the pre-authentication service. According to an exemplary embodiment, network device 110, server 210, end device 130, a peer component, or another type of device that includes logic of the pre-authentication service may perform a step of process 500. According to an exemplary implementation, processor 410 executes software 420 to perform the step of process 500, as described herein. Alternatively, the step may be performed by execution of only hardware. According to some exemplary embodiments, process 500 may be implemented as a (modified) TLS handshake procedure. According to other exemplary embodiments, process 500 may be implemented as another type of handshake, as described herein.

In block 505, a device may receive a first message that includes an authentication string. For example, the first message may be a Hello or another type of message that initiates a TLS-based handshake. The Hello may include an extension field that has the authentication string, as described herein. The authentication string may include plaintext and a MAC. According to other embodiments, the authentication string may include ciphered text and various combinations of data used by a MAC algorithm, as described herein.

According to various exemplary embodiments, the device may perform block 510 or block 515. For example, in block 510, the device may perform a key lookup, as described herein. For example, the device may perform a lookup of a secret key based on an identifier of the other device included in the authentication string. According to some exemplary embodiments, when the identifier is not found, the device may determine that the other device is not authenticated and/or not authorized. Alternatively, instead of performing a lookup, in block 515, the device may generate a key. For example, the device may generate the secret key based on a master key, as described herein.

In block 520, the device may generate an authentication string. For example, the device may generate the authentication string in a manner corresponding to the way the authentication string of the first message was generated, as described herein.

In block 525, the device may compare the authentication strings. For example, the device may compare the generated authentication string to the received authentication string.

In block 530, it may be determined whether the authentication strings match or not based on the comparison. When the authentication strings match (block 530—YES), the device may generate and transmit a second message (block 535). For example, the device may determine that the other device is authenticated. The second message may be a Hello and may be transmitted to the other device. When the authentication strings do not match (block 540—NO), process 500 may end. For example, the device may determine that the other device is not authenticated. The device may not permit a connection with the other device. The device may perform another type of security measure, such as blacklist the other device, remove an identifier of the other device from a whitelist, and the like.

FIG. 5 illustrates an exemplary embodiment of a process of the pre-authentication service, however according to other exemplary embodiments, the pre-authentication service may perform additional operations, fewer operations, and/or different operations than those illustrated and described. For example, the device may perform determine whether the other device is authorized, as described herein. Additionally, for example, the device may perform an on-boarding procedure relative to the other device, as described herein.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks has been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a first device from a second device, a first message that includes a first authentication string including a password or a message authentication code, and initiates a handshaking procedure with the first device;
   generating, by the first device, a second authentication string based on the first authentication string;
   comparing, by the first device, the second authentication string and the first authentication string;
   determining, by the first device based on the comparing, whether the second device is authenticated; and
   determining, by the first device, whether to establish a connection with the second device based on the determining.

2. The method of claim 1, wherein the handshaking procedure is a transport layer security (TLS) handshaking procedure, and the first message is a client hello of the TLS that includes the first authentication string in an extension field of the client hello.

3. The method of claim 2, further comprising:
   omitting, by the first device, to transmit a message to the second device based on determining that the second device is not authenticated.

4. The method of claim 1, further comprising:
   identifying, by the first device, a secret key based on an identifier of the second device included in the first authentication string, and wherein the generating of the second authentication string further comprises:
   generating, by the first device, the second authentication string based on the secret key and other data included in the first authentication string.

5. The method of claim 1, further comprising:
   generating, by the first device, a secret key based on a master key and an identifier of the second device included in the first authentication string, and wherein the generating of the second authentication string further comprises:
   generating, by the first device, the second authentication string based on the secret key and other data included in the first authentication string.

6. The method of claim 5, wherein the other data includes at least one of an identifier that identifies the master key or an identifier of an anti-malware component of the second device.

7. The method of claim 1, further comprising:
   issuing, by the first device to the second device before the receiving, an identifier of the second device and a secret key.

8. The method of claim 1, further comprising:
   determining, by the first device, whether the second device is an authorized device based on the first authentication string.

9. A device comprising:
   a processor configured to:
   receive, from a second device, a first message that includes a first authentication string including a password or a message authentication code, and initiates a handshaking procedure with the device;

generate a second authentication string based on the first authentication string;

compare the second authentication string and the first authentication string;

determine, based on the comparison, whether the second device is authenticated; and determine whether to establish a connection with the second device based on the determination.

10. The device of claim 9, wherein the handshaking procedure is a transport layer security (TLS) handshaking procedure, and the first message is a client hello of the TLS that includes the first authentication string in an extension field of the client hello.

11. The device of claim 9, wherein the processor is further configured to:

omit to transmit a message to the second device based on a determination that the second device is not authenticated.

12. The device of claim 9, wherein the processor is further configured to:

identify a secret key based on an identifier of the second device included in the first authentication string, and wherein for the generation of the second authentication string, the processor is further configured to:

generate the second authentication string based on the secret key and other data included in the first authentication string.

13. The device of claim 9, wherein the processor is further configured to:

generate a secret key based on a master key and an identifier of the second device included in the first authentication string, and wherein for the generation of the second authentication string, the processor is further configured to:

generate the second authentication string based on the secret key and other data included in the first authentication string.

14. The device of claim 13, wherein the other data includes at least one of an identifier that identifies the master key or an identifier of an anti-malware component of the second device.

15. The device of claim 9, wherein the processor is further configured to:

issue to the second device before the receipt of the first message, an identifier of the second device and a secret key.

16. The device of claim 9, wherein the processor is further configured to:

determine whether the second device is an authorized device based on the first authentication string.

17. A non-transitory computer-readable storage medium storing instructions executable by a processor of a device, which when executed cause the device to:

receive, from a second device, a first message that includes a first authentication string including a password or a message authentication code, and initiates a handshaking procedure with the device;

generate a second authentication string based on the first authentication string;

compare the second authentication string and the first authentication string;

determine, based on the comparison, whether the second device is authenticated; and determine whether to establish a connection with the second device based on the determination.

18. The non-transitory computer-readable storage medium of claim 17, wherein the handshaking procedure is a transport layer security (TLS) handshaking procedure, and the first message is a client hello of the TLS that includes the first authentication string in an extension field of the client hello.

19. The non-transitory computer-readable storage medium of claim 17, wherein the instructions further comprise instructions, which when executed cause the device to:

omit to transmit a message to the second device based on a determination that the second device is not authenticated.

20. The non-transitory computer-readable storage medium of claim 17, wherein for the generation of the second authentication string, the instruction further comprise instructions, which when executed cause the device to:

generate the second authentication string based on a secret key and other data included in the first authentication string, wherein the other data includes at least one of an identifier that identifies a master key or an identifier of an anti-malware component of the second device.

* * * * *